United States Patent
Li et al.

(10) Patent No.: US 12,517,921 B2
(45) Date of Patent: Jan. 6, 2026

(54) BLOCKCHAIN-BASED FEDERATED DATA DISCOVERY AND SHARING

(71) Applicant: InterDigital Patent Holdings, Inc., Wilmington, DE (US)

(72) Inventors: Xu Li, Plainsboro, NJ (US); Chonggang Wang, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/561,791

(22) PCT Filed: May 17, 2022

(86) PCT No.: PCT/US2022/029532
§ 371 (c)(1),
(2) Date: Nov. 17, 2023

(87) PCT Pub. No.: WO2022/245756
PCT Pub. Date: Nov. 24, 2022

(65) Prior Publication Data
US 2024/0265005 A1    Aug. 8, 2024

Related U.S. Application Data

(60) Provisional application No. 63/189,488, filed on May 17, 2021.

(51) Int. Cl.
*G06F 16/25* (2019.01)
*G06F 16/27* (2019.01)

(52) U.S. Cl.
CPC ............ *G06F 16/256* (2019.01); *G06F 16/27* (2019.01)

(58) Field of Classification Search
CPC ............................... G06F 16/256; G06F 16/27
See application file for complete search history.

(56) References Cited

U.S. PATENT DOCUMENTS

2011/0119163 A1* 5/2011 Smith .................... G06Q 40/00
705/400
2018/0293670 A1* 10/2018 Yin ........................ H04L 9/3236
(Continued)

FOREIGN PATENT DOCUMENTS

WO       2020/221449 A1    11/2020

OTHER PUBLICATIONS

Lee, Keon Myung, and Ilkyeun Ra. "Data privacy-preserving distributed knowledge discovery based on the blockchain." Information Technology and Management 21.4 (2020): 191-204. (Year: 2020).*

(Continued)

*Primary Examiner* — Jay A Morrison
(74) *Attorney, Agent, or Firm* — Condo Roccia Koptiw LLP

(57) ABSTRACT

Distributed ledger-based federated data discovery and sharing may be implemented by soliciting one or more discoverers to serve a federated data discovery request. A discovery solicitation may include a discovery proposal, indicating the data type(s) to be discovered by the solicited discoverer(s), the organization(s) that may provide the data type(s), the performance parameter(s), and/or the service fee(s). A discovery proposal may be updated, for example, based on a negotiation. An (e.g., acknowledged/agreed) transaction may be provided to a distributed ledger node. A smart contract may be generated for the federated data discovery request. Notification(s) about triggering the smart contract may be provided to the one or more discoverers. A discovery result responsive to the federated data discovery request may be received based on performance of the discovery task(s) with the organization(s) by the discoverer(s).

18 Claims, 10 Drawing Sheets

(56) References Cited

U.S. PATENT DOCUMENTS

2021/0383918 A1\* 12/2021 Martin ................... G16H 40/67
2022/0210160 A1\* 6/2022 Opsenica ................ H04L 47/82

OTHER PUBLICATIONS

U.S. Appl. No. 63/036,988, filed Jun. 9, 2020. (Year: 2020).\*
Ekblaw et al., "A Case Study for Blockchain in Healthcare: "MedRec" prototype for electronic health records and medical research data", White Paper; MedRec: Using Blockchain for Medical Data Access and Permission Management; IEEE, Aug. 2016, 13 pages.
European Telecommunications Standards Institute (ETSI) GR PDL 003 V1.1.1, "Permissioned Distributed Ledger (PDL), Application Scenarios", Dec. 2020, pp. 1-38.
European Telecommunications Standards Institute (ETSI), GR PDL 010 V0.0.2, "PDL Operations in Offline Mode", Nov. 2020, 19 pages.
Zhuang et al., "Data-as-a-Service: A Cloud-Based Federated Platform to Facilitate Discovery of Private Sector Datasets", 2015 International Conference on Cloud Computing Research and Innovation, Oct. 2015, 6 pages.

\* cited by examiner

BLOCKCHAIN-BASED FEDERATED DATA DISCOVERY AND SHARING

CROSS-REFERENCE TO RELATED APPLICATIONS

This is the National Stage Entry under 35 U.S.C. § 371 of Patent Cooperation Treaty Application No. PCT/US2022/029532, filed May 17, 2022, which application claims the benefit of U.S. Provisional Application No. 63/189,488, filed May 17, 2021, which is hereby incorporated herein by reference in its entirety.

BACKGROUND

Data collection/discovery from databases maintained by different organizations by users, for example, a researcher or a device that is a part of Internet of Things (IoT) network and/or Industrial IoT (IIoT) network may involve data collection from different devices, parties, and/or systems. Such data collection may also involve collaboration between multiple parties. Current mechanisms used for data collection, data storage, and data collaboration between multiple parties may not be adequate.

SUMMARY

Systems, methods, and instrumentalities are described herein for blockchain-based federated data discovery and sharing. A device running a federated data discovery and sharing service may solicit one or more discoverers to serve a federated data discovery request indicating a set of data types to be discovered. A discovery solicitation request may include a discovery proposal for one or more discoverers. The discovery proposal may include at least the data type(s) to be discovered by the solicited discoverer(s), the organization(s) that may provide the data type(s), the performance parameter(s), or the service fee(s).

A discovery proposal may be updated, for example, based on a negotiation with a discoverer. An (e.g., acknowledged/agreed) transaction may be provided to a distributed ledger node (e.g., a blockchain node). A smart contract may be generated for the federated data discovery request. Notification(s) about triggering the smart contract may be provided (e.g., as a discovery task allocation) to the one or more discoverers. A (e.g., an aggregated) discovery result responsive to the federated data discovery request may be received based on performance of the discovery task(s) with the organization(s) by the discoverer(s).

EXAMPLE NETWORKS FOR IMPLEMENTATION OF THE EMBODIMENTS

Systems, methods, and instrumentalities are described herein for blockchain-based federated data discovery and sharing. Joint credit-based and/or reputation-based federated data discovery and sharing may be used to coordinate federated data discovery among multiple organizations through a blockchain system. Collaborative federated data discovery may be efficiently enabled among multiple untrusted discovers. A smart contract may be leveraged, for example, to build trust between different untrusted discovers, e.g., to motivate discoverers to work collaboratively. A (e.g., each) party using a smart contract may have an incentive to work diligently, for example, since a reward allocation among different discovers may be based on a (e.g., each) party's contributions.

Figure 1A:
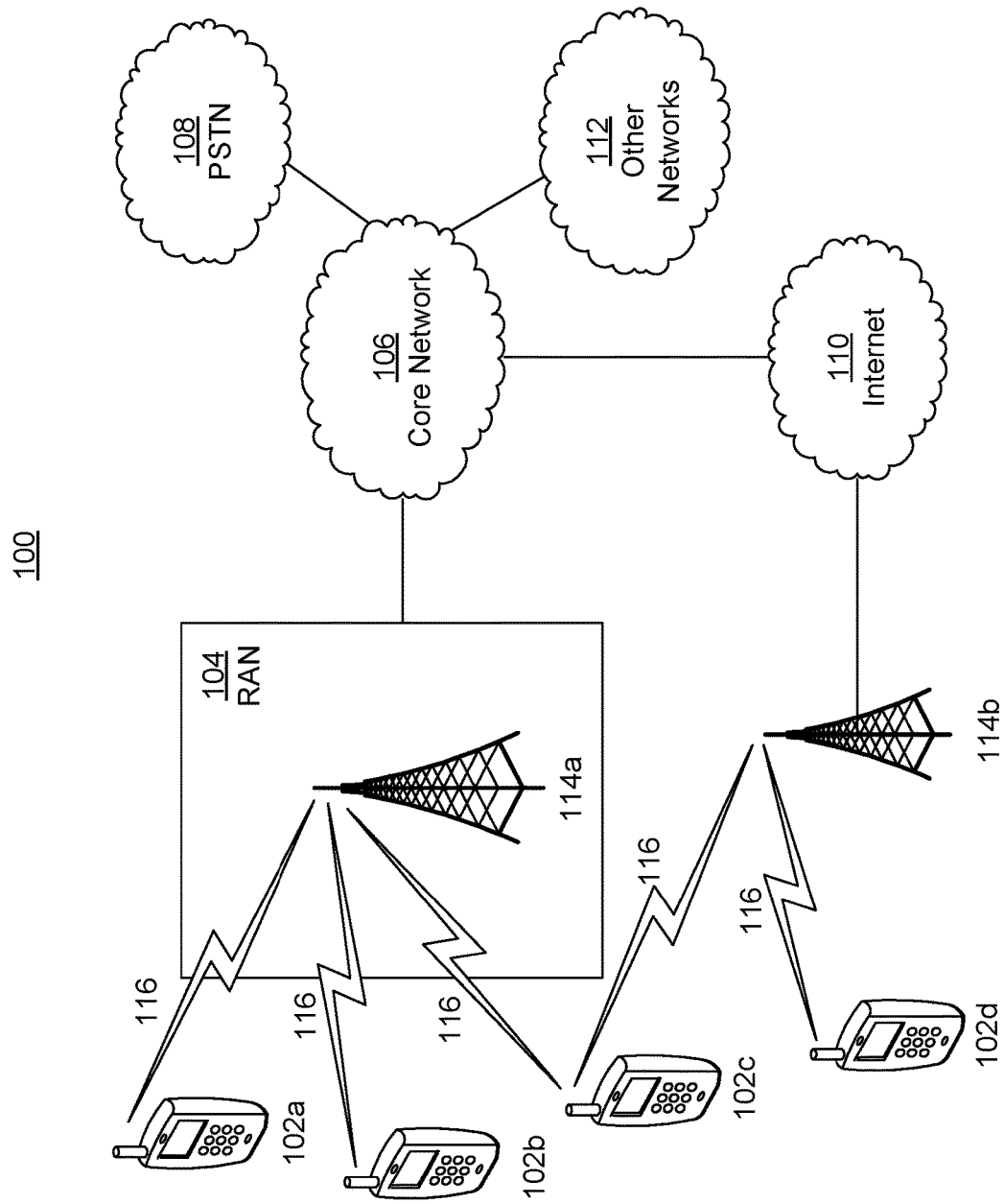
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 1020, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WIFI), IEEE 802.16 (i.e., Worldwide Interoperability for Microwave Access (WiMAX), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (Qos) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WIMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
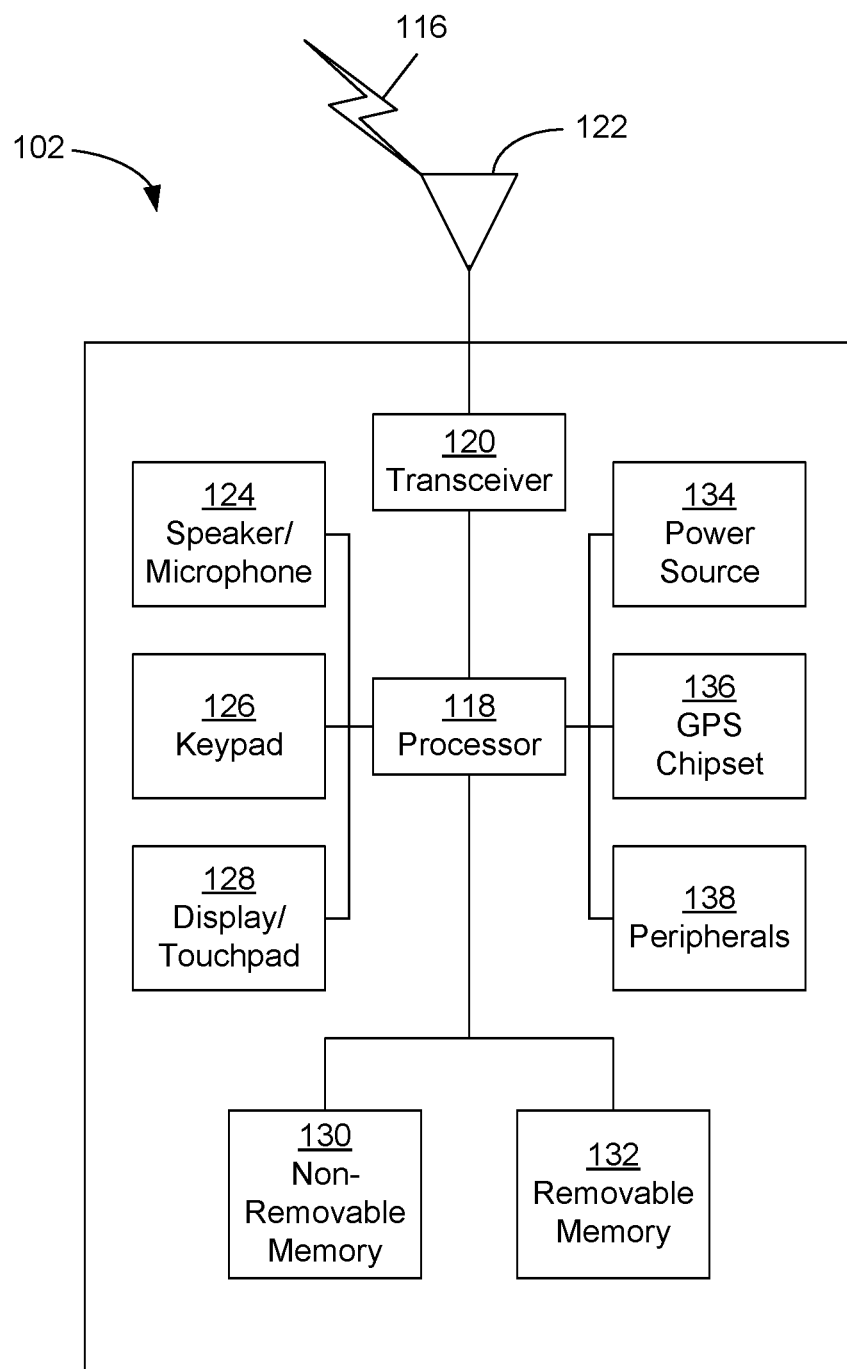
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
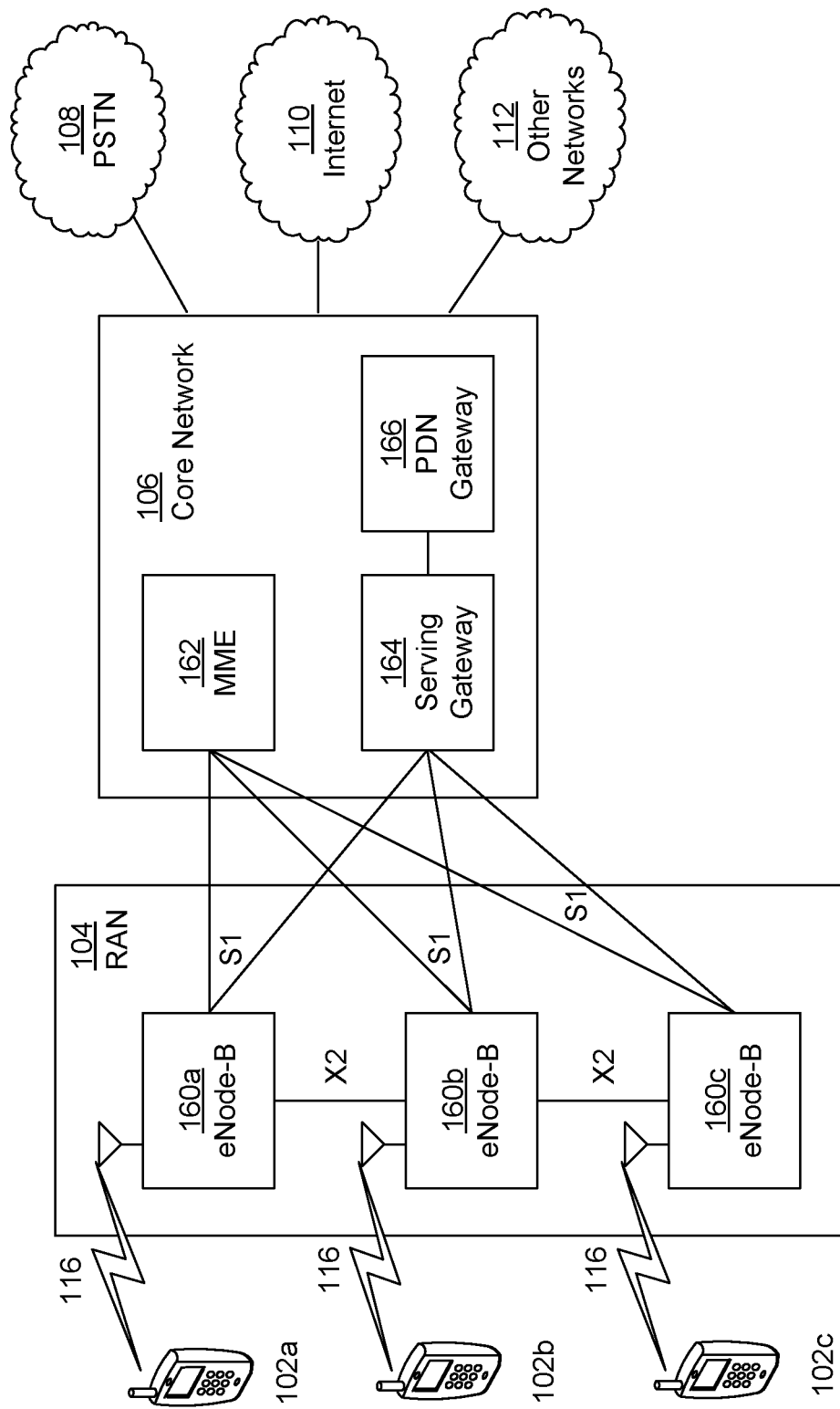
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 1600 may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHZ channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHz, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
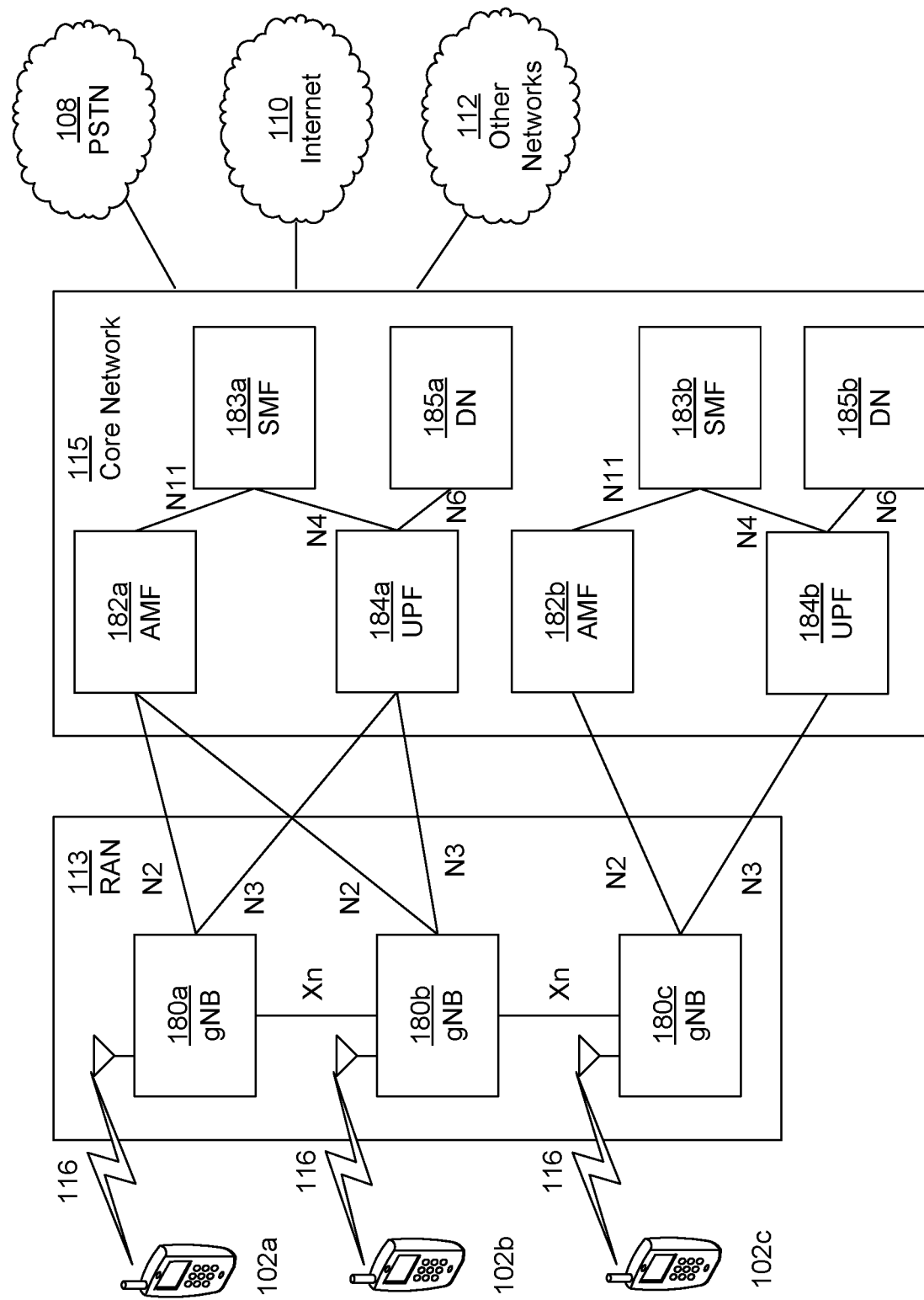
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

One or more embodiments described herein may utilize one or more of the systems disclosed in figures FIG. 1A through FIG. 1D.

Blockchain technology may be utilized and/or deployed in conjunction one or multiple techniques, such as cryptography, hashing, Merkle tree, distributed ledgers, Peer-to-Peer (P2P) networking, and/or consensus protocols. Blockchain technology may integrate the techniques together to enable a system that may be used to provide one or more (e.g., advanced) features, such as decentralization, immutability, transparency, and/or security. A system using blockchain technology may be referred to as a blockchain system. Applications using and/or supported by a blockchain system may be referred to as blockchain applications. A blockchain system may be underpinned by underlying blockchain networks, which may include (e.g., may be composed of) multiple (e.g., many) participating blockchain nodes. For example, a blockchain node may be a distributed ledger node. A (e.g., each) blockchain node may host one or more distributed blockchains (e.g., a form of distributed ledgers) and/or may participate in the blockchain system. For example, blockchain nodes may broadcast blockchain transactions and/or blocks among each other (e.g., using peer-to-peer networking). Blockchain nodes may perform consensus protocols with each other, for example, to reach distributed trust without relying on a centralized party. A blockchain transaction may be, for example, a digital representation of a real-world transaction, a digital record of physical assets, a digital record of a physical event, a digital record of an (e.g., any) action in an information system, a digital payment, and/or a digital smart contract. A block may group multiple blockchain transactions together. A blockchain may be a data structure to chain a (e.g., growing) number of blocks. Blockchain technology may (e.g., be used as a generic term to) represent a (e.g., much) broader distributed ledger technology. Blockchain technology and distributed ledger technology may be used synonymously or interchangeably herein. Systems, methods, and instrumentalities are described herein may (e.g., also) be applicable to one or more (e.g., any) blockchain technologies and/or distributed ledger technologies, such as permissioned distributed ledger (PDL).

Systems, methods, and instrumentalities are described herein for blockchain-based federated data discovery and sharing. In an example, multiple organizations, for example, independent organizations may be part of a system. An (e.g., each) organization may maintain local data. The multiple organizations may not trust each other. The multiple organizations may desire to discover (e.g., access) each other's data. A data discovery request may be served by one or multiple other (e.g., unnecessarily trusted) organizations.

A user from an organization X may issue a discovery request to a different organization Y. The user may (e.g., also) provide the user's local data for entities from other organizations to discover. Multiple organizations may discover and share data from each other. A mechanism may enable and build mutual trust among the untrusted organizations. An organization providing data may be rewarded or collect credits, for example, while the user/organization discovering/utilizing the data may make contributions or pay credits for the data.

Joint credit-based and/or reputation-based federated data discovery and sharing may be provided for coordinating federated data discovery among multiple organizations through a blockchain system. Credit and reputation as measures in combination with blockchain system may be utilized to establish trust and incentive between multiple organizations. The established trust may enable trustful federated data discovery and sharing among multiple organizations. An organization, e.g., Organization-1, may collect and/or earn sufficient credit to discover data from other organizations. Organization-1 may use its credit as a form of payment to other organizations that may serve Organization-1's data discovery requests. A blockchain system (e.g., a permissioned distributed ledger (PDL) system)) may assign certain initial credit to Organization-1. The credit may be assigned, for example, when Organization-1 registers with the blockchain system. Other organizations (e.g., Organization-2 and/or Organization-3) may have sufficient reputation in order to serve the data discovery request from Organization-1. The blockchain system may assign an initial reputation to Organization-2 and/or Organization-3, for example, at the time of registering with the blockchain system. Organization-1 may assess and/or report the quality of the discovered data to the blockchain system. The reputation of Organization-2 and/or Organization-3 may be altered (e.g., reduced or increased), for example, based on the quality of data the organization provides to the Organization-1.

Collaborative federated data discovery may be enabled among multiple untrusted discoverers. Collaborative federated data discovery may utilize smart contracts to build trust among multiple parties involved. For example, a smart contract may be leveraged to build trust between different untrusted discoverers, e.g., to motivate discoverers to work collaboratively. A (e.g., each) party using a smart contract may have an incentive to work diligently, for example, since a reward allocation among different discoverers may be based on a (e.g., each) party's contributions.

Data may be stored in different locations and/or may belong to different organizations. A given application or a user (e.g., user X) may pose or issue a discovery request for discovering desired data, which may be owned by and/or located in different organizations. Federated discovery processing (e.g., data discovery conducted in multiple organizations) may be used, for example, to process or serve a discovery request (e.g., from a discovery request from a user X). Entities (e.g., third-party entities) acting as discoverers may contribute to serving a discovery request. An entity (e.g., each of the entities) may have a capability for accessing and/or conducting discovery in one or more organizations. For example, a single discoverer may not have a capability (e.g., full capability) for identifying the requested data (e.g., all the requested data) among the potential organizations (e.g., all the potential organizations). Discoverers may not know and/or may not trust each other. User X may agree to pay a service fee for a discovery request. Different discoverers may be motivated to (e.g., truly) work together. An incentive-based mechanism may motivate the discoverers to work diligently. A penalty-based mechanism for poor performance may provide motivation for good work.

In examples, a device (e.g., a network node, a WTRU, an IoT device, or an infrastructure device) providing a federated data discovery and sharing service may receive a federated data discovery request for discovering data including a first data type and a second data type. The federated data discovery request may indicate one or multiple parameters including one or more of: a user identifier (ID) for indicating the identification of a user, desired data types to indicate what types of data are to be discovered, a suggested data residence to indicate for a given desired data type potential places for conducting the discovery, and/or suggested discoverers to indicate one or more preferred discoverers. A federated data discovery request may include a performance metric that may be included in a smart contract. A performance metric may be associated with the acquisition of the first data type (e.g., or a first set of desired data) and the second data type (e.g., or a second set of desired data). A performance metric may be selected from one or more of: a maximum tolerant processing time for conducting discovery at an organization, a quality associated with the identified data, and/or a maximum number of items associated with the discovery result.

The device providing a federated data discovery and sharing service may identify that the data is stored at a first organization and a second organization. The device may identify that a first discoverer conducts data discovery of the first data type at the first organization. The device may further identify that a second discoverer conducts data discovery of the second data type at the second organization.

The device providing a federated data discovery and sharing service may send a first data discovery task proposal information for the first data type to be discovered at the first organization to a first discoverer (e.g., a discoverer agent). The first data discovery task proposal information may be based on the received federated data discovery request. The device may send a second data discovery task proposal information for the second data type to be discovered at the second organization to a discoverer (e.g., a second discoverer agent). The second data discovery task proposal information may be based on the received federated data discovery request. The device may receive a proposal acceptance from the first discoverer agent based on the transmitted first data discovery task proposal information. The device may also receive a proposal acceptance from the second discoverer agent based on the transmitted second data discovery task proposal information. The device may generate, based on receiving the proposal acceptance from the first discoverer agent and the proposal acceptance from the second discoverer agent, a transaction request to create a smart contract. The device may send the transaction request to a blockchain node. In an example, the blockchain node may reside on the device. The device may communicate with the blockchain node over a communication network, as described herein (e.g., FIG. 1A through FIG. 1D).

The device providing a federated data discovery and sharing service may send, to the first discoverer agent, the first data discovery proposal information and an access address of the blockchain node to trigger the created smart contract. The device may further transmit, to the second discoverer agent, the second data discovery proposal information and the access address of the blockchain node to trigger the created smart contract.

The device providing a federated data discovery and sharing service may receive, from the blockchain node, an aggregated data comprising the first data type and the second data type that is identified at the first organization and the second organization respectively. The device may send the aggregated data to a user from which the federated data discovery request was received.

Figure 2:
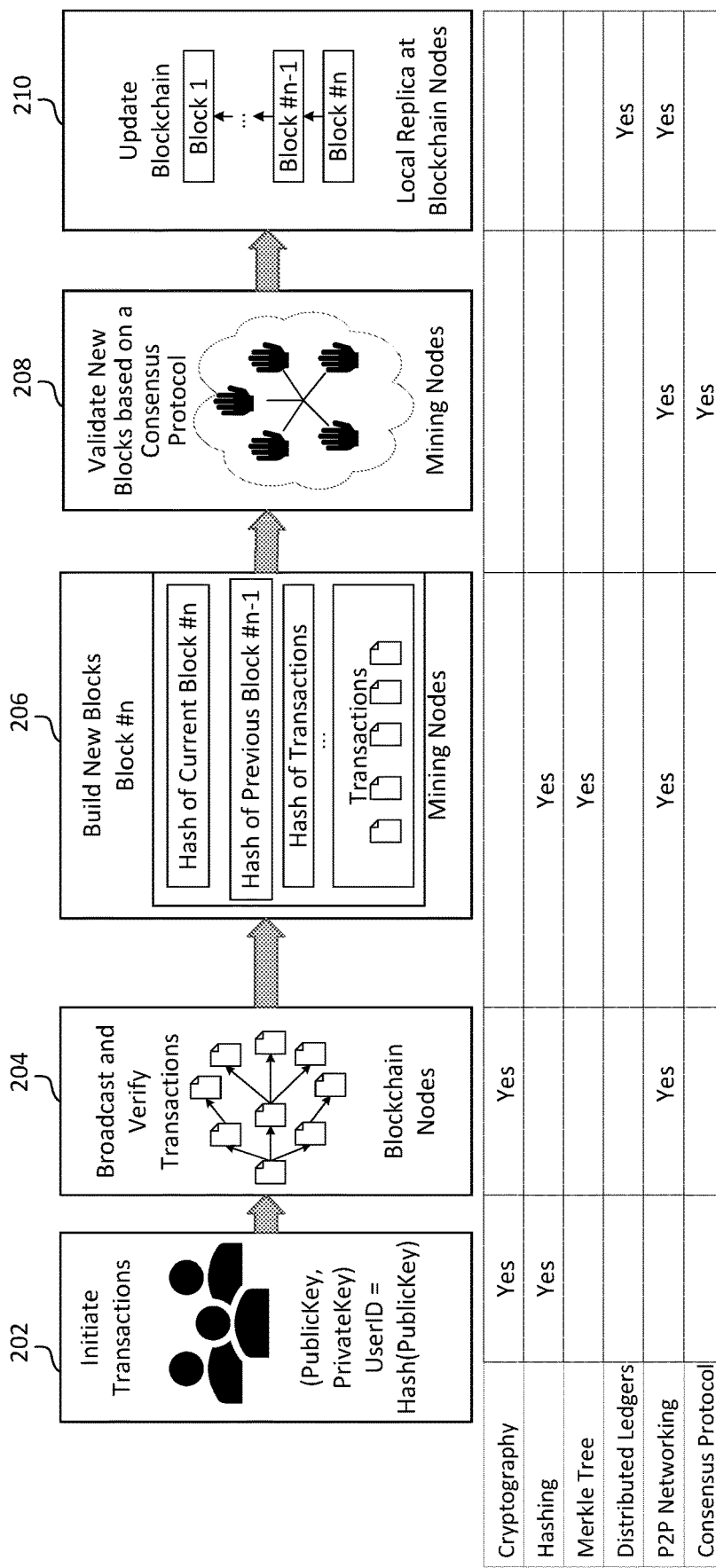
FIG. 2 illustrates an example of the workflow of a blockchain system.

FIG. 2 illustrates an example workflow of a blockchain system. As shown in FIG. 2, a workflow for a blockchain system may include, for example, transaction initiation 202, transaction broadcasting and verification 204, new block building 206, new block validation based on a protocol consensus 208, and/or blockchain updating 210.

As shown in FIG. 2, at 202, transactions may be initiated by blockchain users. A user (e.g., each participating user) may generate (e.g., independently generate) transactions. A user (e.g., each user) may have a user identifier and/or an account identifier (e.g., a hash of the user's public key). A transaction (e.g., each transaction) may be signed, for example, using the user's private key. A user may send transactions to a blockchain network, for example, after a transaction (e.g., a new transaction) is generated by the user. As illustrated in FIG. 2, transaction initiation 202 may utilize cryptography and/or hashing techniques, for example, for maintaining data confidentiality and security.

At 204, transactions may be broadcasted and/or verified. A (e.g., new) transaction may (e.g., first) be received by one or more blockchain nodes that may verify the integrity of the transaction, for example, using the user's public key, which may be included in the transaction. A transaction (e.g., after verification and if the new transaction is valid) may be relayed and/or broadcasted within the blockchain network. One or more (e.g., all) blockchain nodes may receive and have a copy of a (e.g., each) transaction (e.g., all newly generated and valid transactions). As indicated in FIG. 2, verification of broadcast transactions 204 may utilize cryptography and P2P networking techniques.

At 206, a set of blocks (e.g., a set of new blocks) may be built. One or more (e.g., some) blockchain nodes (e.g., mining nodes or full nodes) may group (e.g., start to group) one or more transactions (e.g., newly generated and pending transactions) together, for example, to generate a new block. A block may include, for example, a block header and a block body. A block header may include, for example, a hash of the current block, a hash of the previously confirmed block, and a hash of one or more (e.g., all) included transactions (e.g., a Merkle tree). A block header may be dependent on a consensus protocol. A block header may include additional information. A block body may include the content of one or more transactions (e.g., all included transactions). A (e.g., each) mining node may (e.g., independently attempt to) create a new block. As indicated in FIG. 2, new block building 206 may utilize hashing, Merkle Tree and P2P networking techniques.

At 208, (e.g., new) blocks may be validated, for example, based on a consensus protocol. Mining nodes may (e.g., independently attempt to) create a new block. Mining nodes may run a (e.g., the same) consensus protocol (e.g., proof-of-work in a Bitcoin system). Mining nodes may reach an agreement on who (e.g., a winner) may be allowed to insert a block into the existing blockchain. The winner of a consensus protocol may send a newly generated block to the blockchain network. The new block may be broadcasted. One or more (e.g., all) mining nodes may receive and verify the block from the winner of a consensus protocol. As illustrated in FIG. 2, validation of new blocks based on a consensus protocol 208 may utilize P2P networking and consensus protocol techniques.

At 210, a blockchain may be updated. A block (e.g., a newly generated block after the newly generated block is verified) may be (e.g., successfully) appended to the existing blockchain. The block, (e.g., a newly generated block after the newly generated block is verified) may include a hash of the previous block (e.g., the last block of the previous blockchain). As shown in FIG. 2, blockchain update 210 may utilize distributed ledger and P2P networking techniques.

Figure 3:
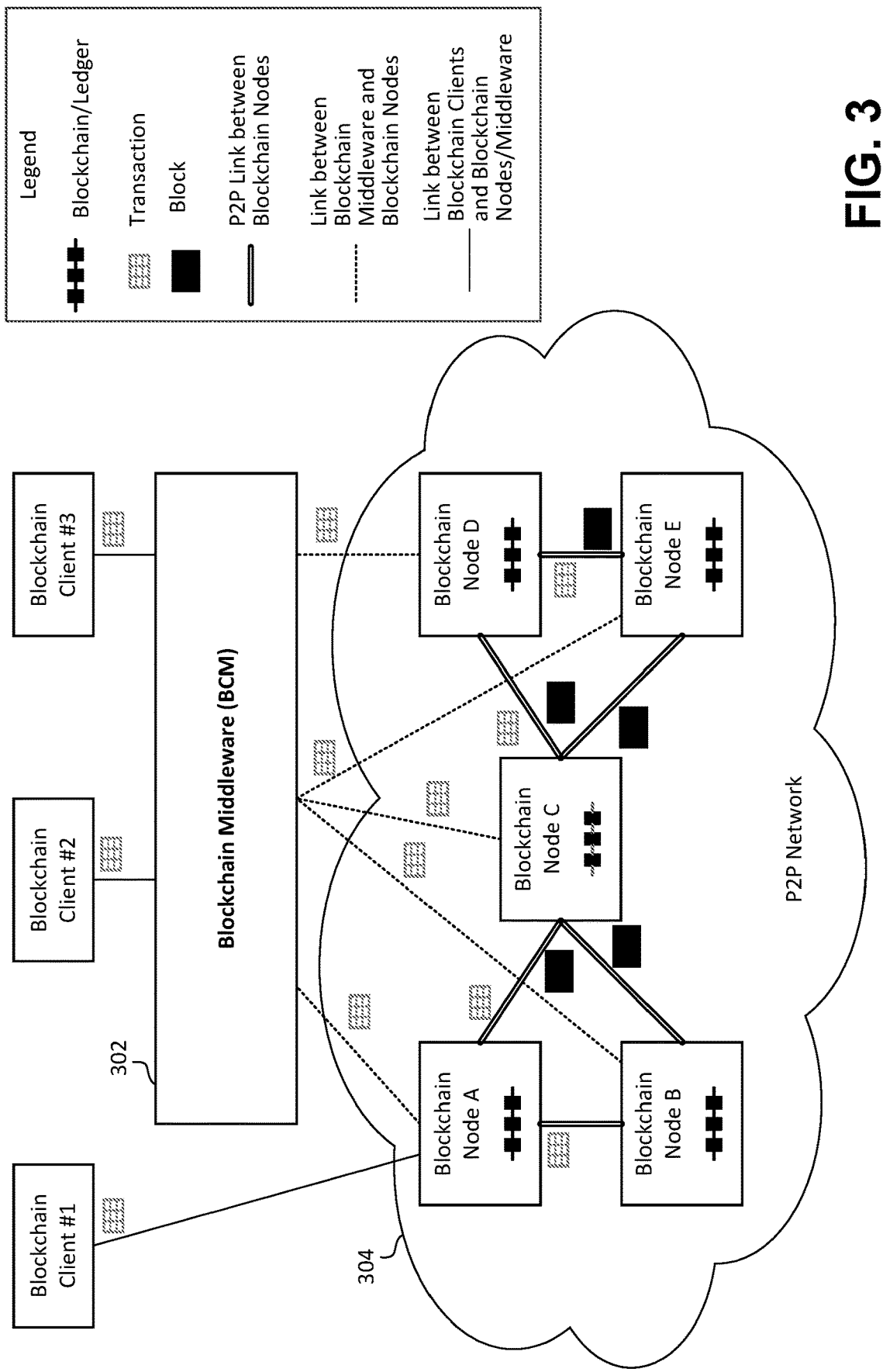
FIG. 3 illustrates an example of a blockchain system architecture.

FIG. 3 illustrates an example of a blockchain system architecture. As shown by example in FIG. 3, a blockchain system may include one or more (e.g., several) types of logical entities, such as a management node (e.g., blockchain middleware (BCM) 302), one or more (e.g., some) blockchain nodes (e.g., blockchain nodes A-E) hosting blockchains or distributed ledgers, and/or one or more (e.g., some) blockchain clients (e.g., blockchain applications), such as blockchain clients #1-3 in P2P network 304.

As shown in FIG. 3, blockchain middleware (BCM) 302 may bridge blockchain clients and blockchain nodes. BCM 302 may interact with blockchain nodes (e.g., blockchain nodes A-E) on behalf of blockchain clients (e.g., blockchain clients #1-3 in P2P network 304). A blockchain client may (e.g., also) interface (e.g., directly interface) with a blockchain node (e.g., on some occasions), for example, as shown by the link between blockchain client #1 and blockchain node A. BCM 302 may manage and/or coordinate one or more (e.g., all) blockchain nodes. For example, a blockchain client may send a blockchain transaction to BCM 302, e.g., without indicating a blockchain node as a destination node. BCM 302 may (e.g., then) select a blockchain node. BCM 302 may forward the blockchain transaction to the selected (e.g., or an appropriate) blockchain node. BCM 302 may be (e.g., regarded as) a proxy for blockchain clients to interact with blockchain nodes. BCM 302 may maintain a (e.g., the same) blockchain/ledger (e.g., as a blockchain node host). Public blockchain systems may not have a BCM 302. A private or permissioned blockchain system may have a BCM 302, for example, for blockchain governance, access control, and/or other management purposes.

Blockchain Nodes (BCNs), such as BCNs A-E, may participate in blockchain workflow and perform actions, for example, as illustrated in FIGS. 2 and 3. Blockchain nodes may be connected, for example, via peer-to-peer (P2P) links (e.g., as indicated in the legend shown in FIG. 2). Blockchain nodes may form a mesh P2P network (e.g., P2P network 304). Transactions and blocks may be broadcast among multiple (e.g., all) blockchain nodes (e.g., two or more of BCNs A-E) over a P2P network (e.g., P2P network 304). A blockchain node may connect to one or multiple other blockchain nodes, for example, as neighbors or neighboring blockchain nodes.

As shown by example in FIG. 3, blockchain node A may have two neighbors (e.g., blockchain node B and blockchain node C). The loss of a blockchain node (e.g., going offline) in a mesh network (e.g., usually) may not impact (e.g., normal) operations of the blockchain system. Other blockchain nodes may remain connected and may be in functioning state, for example, if one of the blockchain nodes (e.g., blockchain node A) goes offline. One or more blockchain nodes may be referred to as critical blockchain nodes, for example, if the loss of the blockchain node may break the mesh network. For example (e.g., as shown in FIG. 2), blockchain node C may be a critical blockchain node. A (e.g., well-designed) P2P routing protocol may avoid the existence of a (e.g., any) critical blockchain node.

A blockchain node (e.g., BCN A-E) may serve multiple blockchain clients (e.g., Blockchain Client #1 through Blockchain Client #3). A blockchain node may receive a transaction from a client. The blockchain node may broadcast the transaction (e.g., a new transaction) throughout a P2P network, for example, so that the transaction may be received by each of the other blockchain nodes in a network. A blockchain node of the network that wins a consensus protocol may generate and broadcast a new blockchain block towards the other blockchain nodes of the network. A (e.g., each) blockchain node may host one or multiple progressing blockchains. Blockchain node connections (e.g., to each other) may be dependent on P2P routing protocols (e.g., gossip-based routing) for the P2P network.

Blockchain nodes (e.g., BCN A-E) and/or P2P routing protocols may be managed and/or coordinated by BCM 302. Blockchain operations may occur, for example, if/when there are blockchain nodes in offline mode. There may be multiple (e.g., two) types of blockchain nodes. For example, a first type of blockchain node may host blockchains (e.g., including sending/receiving transactions and receiving new blocks). The first type of blockchain nodes may not participate in consensus protocols. A second type of blockchain nodes may include an endorser blockchain node, a validator blockchain node, and/or a miner blockchain node. The second type of blockchain nodes may host blockchains and/or may participate in consensus protocols (e.g., including generating new blocks).

A blockchain client (BCC), such as BCC #1-3, may generate (e.g., new) transactions. A BCC may (e.g., directly or indirectly) send (e.g., new) transactions to corresponding blockchain nodes. For example, a BCC (e.g., one of BCC #1-3) may send (e.g., new) transactions to corresponding blockchain nodes (e.g., one or more of BCNs A-E) and/or a BCC may send (e.g., new) transactions to BCM 302, e.g., to be forwarded to blockchain nodes. A blockchain client may interface with one or more blockchain nodes, for example, if/when (e.g., directly) interacting with blockchain nodes. Multiple blockchain clients may connect to a blockchain node (e.g., the same blockchain node). A blockchain client may become offline to a blockchain system, for example, by losing a connection to a blockchain node or blockchain middleware (e.g., BCM 302). A blockchain client may be a blockchain application on a device (e.g., a local blockchain client) or a blockchain application in the cloud (e.g., a remote blockchain client).

Federated data discovery and sharing may be a (e.g., critical) stage of a federated data management pipeline. Federated data discovery and sharing may include data discovery that may be served by multiple organizations. A federated data discovery request may trigger data lookup operations on local data (e.g., data lake(s) maintained by multiple (e.g., different) organizations. A federated data discovery request may lead to discovery results from each of the multiple organizations. Discovery results may be combined or aggregated, for example, into a combined or final result for a federated data discovery request.

Figure 4:
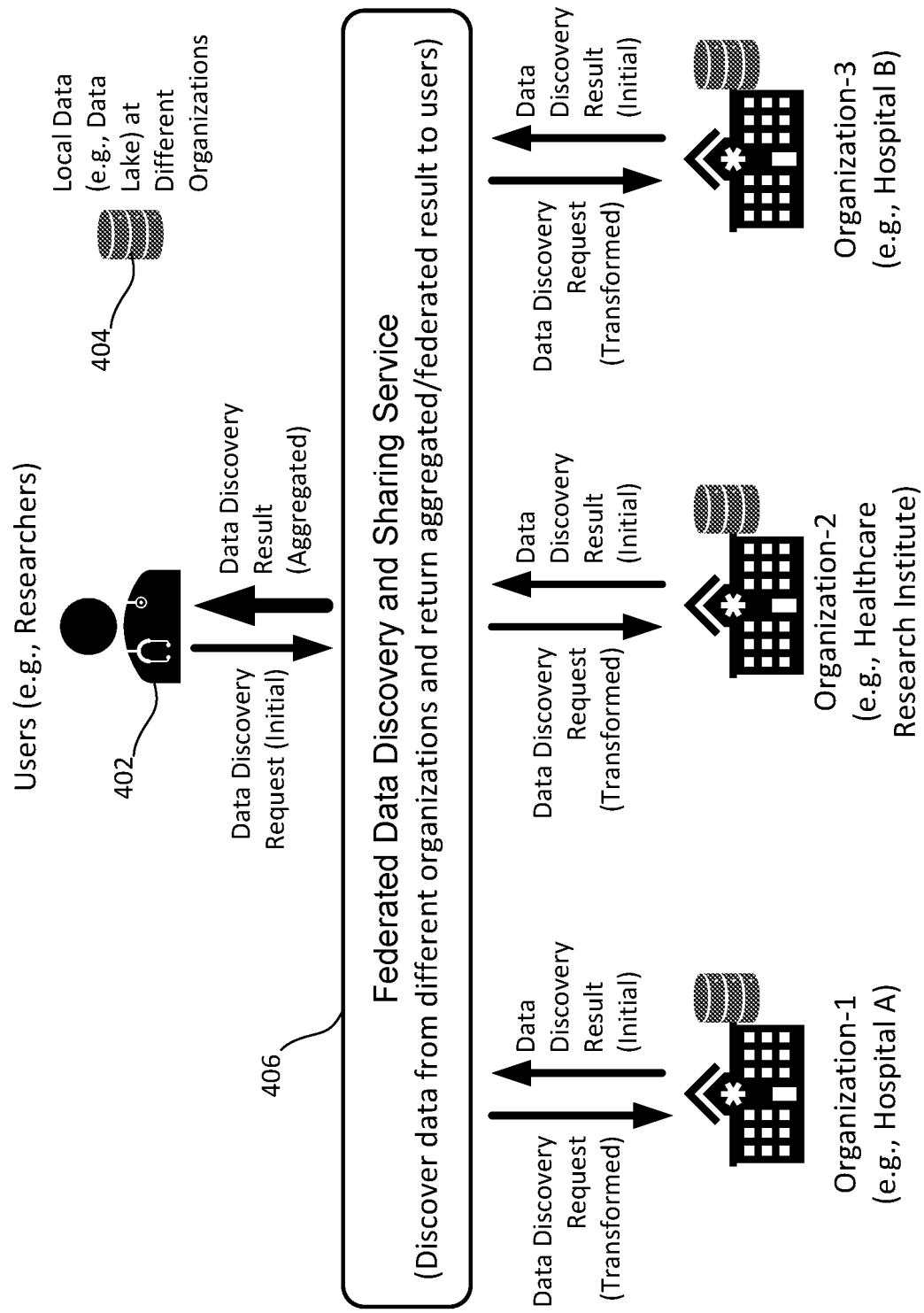
FIG. 4 illustrates an example of a federated data discovery service.

FIG. 4 illustrates an example of a federated data discovery scenario. Users (e.g., researchers) 402 represents one or more devices (e.g., WTRU(s) that may be used for data discovery (e.g., by humans, whether any users or specific users, such as researchers). A user (e.g., a researcher) 402 may discover data (e.g., genomic data) from multiple organizations (e.g., hospitals), such as organization-1 (e.g., hospital A), organization-2 (e.g., healthcare research institute), organization-3 (e.g., hospital B), etc. A user's data discovery request may be served by multiple (e.g., unnecessarily trusted) organizations (e.g., rather than a single organization).

As shown in FIG. 4, a user (e.g., a doctor or a researcher) 402 may issue a (e.g., an initial) data discovery request to a federated data discovery and sharing service 406. The federated data discovery and sharing service 406 may be a logical function with access to local data at different organizations, such as organization-1, organization-2, organization-3, etc. A user 402 may be aware of the address of the federated data discovery and sharing service 406, for example, through pre-configuration or provisioning.

The federated data discovery and sharing service 406 may forward the (e.g., initial) data discovery request to multiple organizations (e.g., organization-1, organization-2, and organization-3). The federated data discovery and sharing service 406 may (e.g., alternatively) transform the (e.g., initial) data discovery request into multiple transformed data discovery requests. As shown in FIG. 4, the federated data discovery and sharing service 406 may forward each of the multiple transformed data discovery requests to a different organization. The federated data discovery and sharing service 406 may (e.g., first) perform authentication and/or authorization, for example, to determine whether the user 402 is authentic and authorized with a right to leverage the federated data discovery and sharing service 406. The federated data discovery and sharing service 406 may enforce one or more access control rules. For example, the initial data discovery request or the transformed data discovery request may or may not be forwarded to one or more organizations based on one or more access control rules (e.g., if the user does not have access rights to the one or more organizations). In some examples, access control rules may (e.g., also) indicate (e.g., specify) a list of data types or items that may not be discoverable.

An (e.g., each) organization (e.g., organization-1, organization-2, and organization-3) may receive a separate data discovery request from the federated data discovery and sharing service 406. An organization may authenticate and/ or authorize the data discovery request, look up the organization's local data against discovery criteria that may be included in the data discovery request, and/or generate a (e.g., an initial or partial) data discovery result. An organization may reject the data discovery request and/or exclude the data in the initial data discovery result, for example, if data cannot be discovered (e.g., due to confidentiality or privacy considerations).

As shown in FIG. 4, the federated data discovery and sharing service 406 may receive (e.g., initial or partial) data discovery results from multiple organizations (e.g., organization-1, organization-2, and organization-3). The federated data discovery and sharing service 406 may aggregate the (e.g., initial or partial) data discovery results. As shown in FIG. 4, the federated data discovery and sharing service 406 may generate an aggregated data discovery result and may forward the aggregated data discovery result to the user 402.

In some examples, organizations (e.g., with discoverable, sharable data) may be end users or end devices (e.g., vehicles, mobile terminals) that maintain their own local data (e.g., local data 404). Users (e.g., users 402) may provide their own data (e.g., local data 404) to be discoverable by other organizations (e.g., organization-1, organization-2, and organization-3).

As illustrated in FIG. 4, multiple organizations and distributed data may be involved in a federated data discovery and sharing service 406, which may lead to one or more the following issues: trust, incentivization, quality, privacy, and access control.

For example, a user from an organization X may issue a discovery request to a different organization Y. A user may provide its local data for entities from other organizations to discover. Multiple organizations may discover and share data from each other. A trust mechanism may enable and build mutual trust among the untrusted organizations.

Multiple organizations may be incentivized to make their data discoverable and sharable to other organizations. An organization providing data may be rewarded or may collect credits while the user/organization discovering/utilizing the data may make contributions or pay the credits for the data it may obtain.

The quality of the discovered data may be improved or guaranteed. An (e.g., each) organization may maintain and provide (e.g., the same type of) data, for example, with different quality and quantity. A user's discovery request may be satisfied, for example, by discovering data with an appropriate quality. The quality of federated data discovery results may be impacted by an ability to discover data with an appropriate quality.

Privacy and/or access control may be implemented. For example, local data provided by an organization may be discoverable (e.g., only) by certain users/organizations. In another example, an organization may hide data source information for discoverable data.

Blockchain technology may be leveraged to solve or mitigate one or more issues (e.g., trust, incentivization, quality, privacy, and access control). For example, a data discovery and sharing record may be (e.g., permanently) recorded in a blockchain. A trust relationship among (e.g., all) participating organizations may be (e.g., automatically) established. Smart contracts may be used, for example, to support (e.g., enable) incentivized interactions between organizations providing local data and organizations discovering data. Blockchain governance may be leveraged for access control of federated data discovery and sharing.

Data may be stored in different locations and/or may belong to different organizations. For example, a hospital may have (e.g., detailed) patient record data while a medical lab company (e.g., LabCorp) may have lab testing data (e.g., blood, urine, and/or the like), and a limited or restricted number of users (e.g., only certain parties) may have the privilege(s) to access the data. An application or a user X may desire (e.g., have a need) to discover data, which may be owned and/or located in or by different organizations.

Federated discovery processing may be used to conduct discovery operations in multiple organizations, for example, if/when a vertical application or a user X poses a discovery request. A user X may not have the capability to (e.g., directly) conduct the discovery. User X may pose a discovery request (e.g., by paying a service fee). There may be ad hoc discoverers (e.g., workers) that may serve a discovery request. In an analogous example, a human may input keywords in a search engine while the search engine may find desired web resources and return the search results. In some examples, the discovery processing may not be free (e.g., different from the existing free search engines, such as Google, Bing, etc.). A discovery request may be (e.g., mainly) served by individual parties, which may be referred to as discoverers, for example, in contrast to a cloud provider.

A discoverer may be a part of or located at one or more of the following types of nodes: a WTRU, a gateway node, a network node, etc. A WTRU may include, for example, as a vehicle, a smart phone, a drone, a robot, etc. A gateway node may include, for example, an access point, a base station, a home gateway, a road-side unit etc. A network node may include, for example, a network function, a network infrastructure node, a cloud server, a data repository, etc. A discoverer agent (and/or a discoverer) may be part of a node (e.g., a node may include a discoverer agent and/or a discoverer).

In some example scenarios, a data discovery request may be posed by a user X (e.g., a vertical application). Third-party entities may contribute to serving the discovery request. For example, each of multiple entities may have the capability to access and/or conduct discovery in one or more organizations. A single discoverer (e.g., alone) may not have a (e.g., full or complete) capability for identifying the requested data (e.g., from among one or more potential organizations with the data). For example, a user X may pose a discovery request seeking to discover desired data among Organizations 1-4. A discoverer (e.g., discoverer A) may (e.g., attempt to) serve the discovery request. One or more discoverers may have a direct or an indirect relationship with one or more organizations. For example, Discoverer A may have a discovery privilege within Organizations 1 and 2. Another discoverer (e.g., discoverer B) may have a discovery privilege within Organizations 3 and 4. Discoverers A and B may work collaboratively, for example, to produce (e.g., complete or high-quality) discovery results for the discovery request by user X.

Discoverers A and B may not know and/or may not trust each other. It may be difficult to make discoverers A and B (e.g., constructively or truly) work together, for example, even if the user X agrees to pay a service fee to make the discovery request. Discoverers A and B may be motivated by self-interest with or without an incentive mechanism for discoverers/workers A and B to (e.g., diligently) work together. There may or may not be a penalty mechanism for poor performance by discoverers A and B (e.g., a punishment for not working together or being lazy). A (e.g., an efficient) mechanism may support (e.g., enable) collaborative federated data discovery among multiple untrusted discoverers.

Example implementations described herein (e.g., resolving one or more issues described herein) may be implemented alone or in any combination. Example implementations described herein may be independent of and/or dependent on one or more other implementations described herein.

Federated data discovery and sharing may be implemented as joint credit-based and/or reputation-based federated data discovery and sharing (e.g., in some implementations). Credit and reputation may be (e.g., jointly) used (e.g., as two mechanisms) with a blockchain system, for example, to solve trust and incentive issues, for example, by supporting (e.g., enable) trustful federated data discovery and sharing among multiple (e.g., unnecessarily trustful) organizations. An organization (e.g., organization-1) may collect or earn (e.g., sufficient) credit, for example, to serve data discovery requests from other organizations. An organization (e.g., organization-1) may consume credit and pay to other organizations that serve data discovery requests from the organization (e.g., organization-1). A blockchain system (e.g., a permissioned distributed ledger (PDL) system) may assign a (e.g., an initial) credit to an organization (e.g., organization-1), for example, (e.g., at the very beginning) if/when the organization (e.g., organization-1) registers with the blockchain system. Other organizations (e.g., organization-2 and organization-3) may have a (e.g., sufficient, such as a requested or required) reputation, for example, to serve a data discovery request from an organization (e.g., organization-1). The blockchain system may assign a (e.g., an initial) reputation to other organizations (e.g., organization-2 and organization-3), for example, (e.g., at the very beginning) if/when they register with the blockchain system. An organization (e.g., organization-1) may assess and report the quality of the discovered data (e.g., discovered by organization-2 and organization-3) to the blockchain system. The reputation of the data providing organizations (e.g., organization-2 or organization-3) may be reduced, for example, if they perform poorly (e.g., provide bad-quality data) to the organization that made a request (e.g., organization-1). The reputation of organizations (e.g., organization-2 or organization-3) may be increased, for example, if they provide good-quality data to the requesting organization (e.g., organization-1). The reputation of the requesting organization (e.g., organization-1) may be decreased, for example, if the requesting organization (e.g., organization-1) misreports (e.g., misrepresents or cheats on) the quality of the discovered data.

Figure 5A:
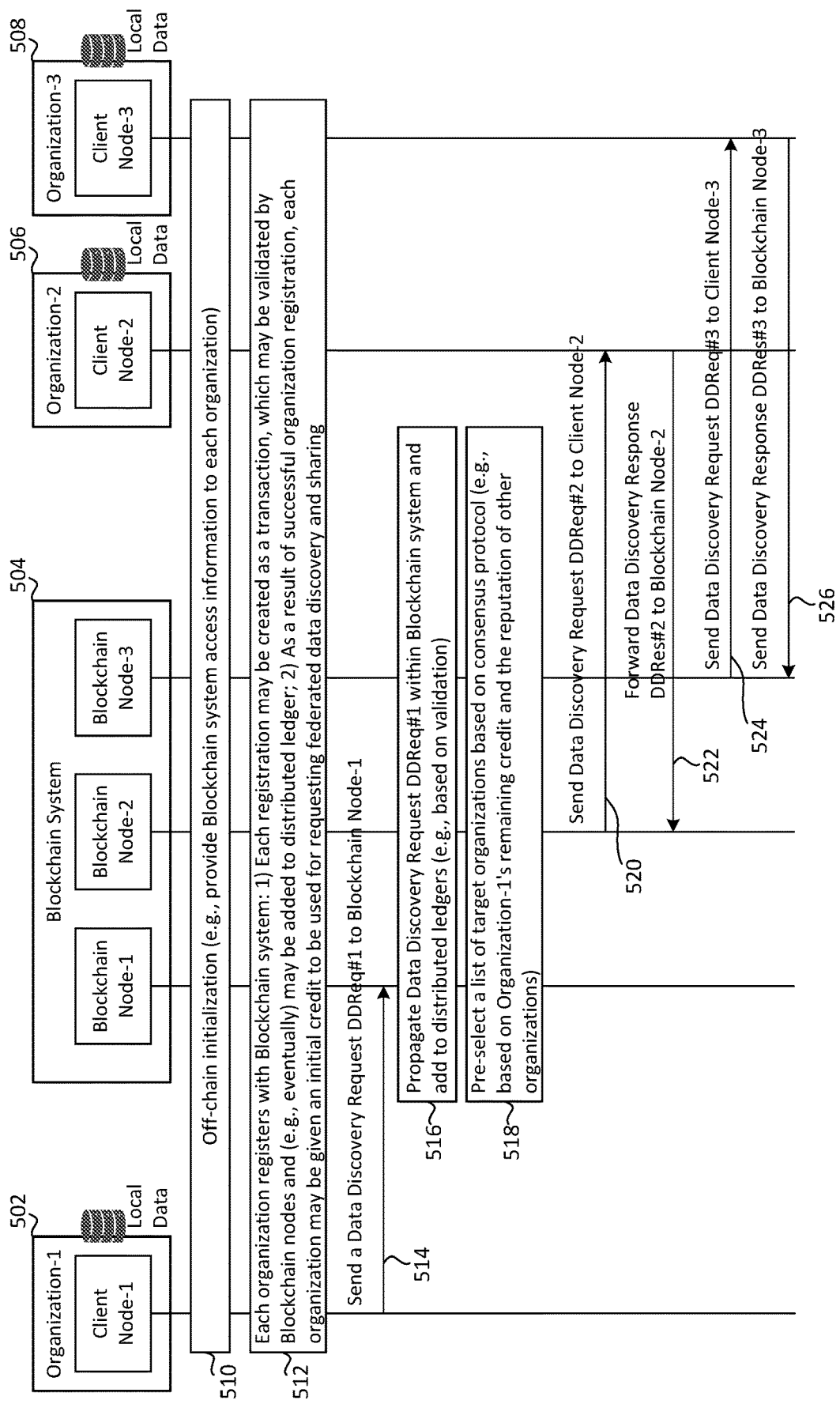
FIGS. 5A and 5B illustrate an exemplary interaction diagram for a joint credit-based and reputation-based federated data discovery and sharing process.
Figure 5B:
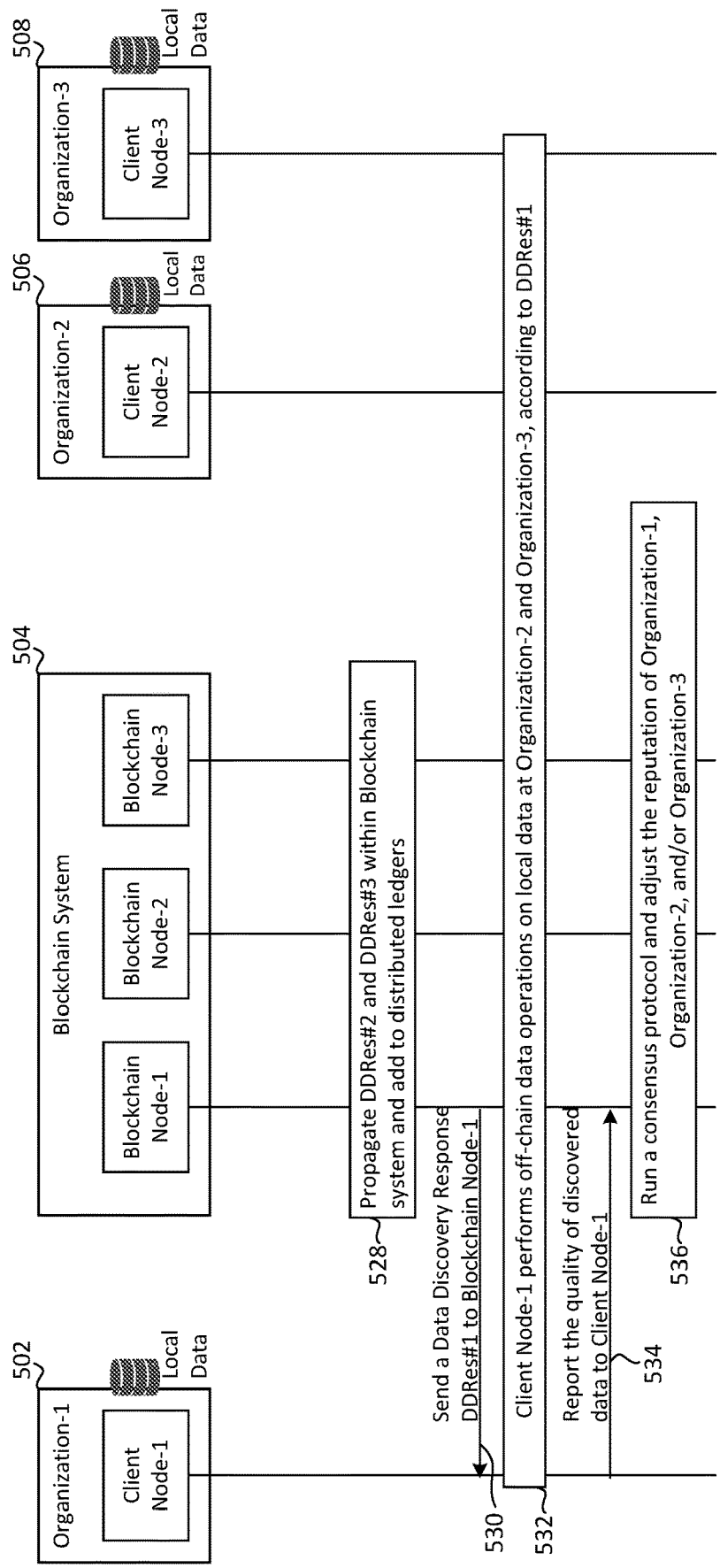

FIGS. 5A and 5B illustrate an example of an interaction diagram for a joint credit-based and reputation-based federated data discovery and sharing process. In some examples, there may be multiple (e.g., three) organizations (e.g., as shown in FIGS. 5A and 5B). As shown by example in FIG. 5, a joint credit-based and reputation-based federated data discovery and sharing system may include organization-1 502, organization-2 506, organization-3 508 and blockchain system 504. The example presented in FIGS. 5A and 5B and/or other examples described herein may be applicable to more or fewer than three organizations. In some examples (e.g., as shown in FIGS. 5A and 5B), blockchain nodes may be PDL nodes (e.g., Blockchain Node-1 may be PDL Node-1, Blockchain Node-2 may be PDL Node-2, and Blockchain Node-3 may be PDL Node-3).

There may be pre-conditions (e.g., as illustrated by example in FIGS. 5A and 5B). For example, a (e.g., each) organization may maintain local data. A (e.g., each) organization may have a client node as a logical function. For example, Organization-1 502 may be configured with Client Node-1, Organization-2 506 may be configured with Client Node-2, and/or Organization-3 508 may be configured with Client Node-3. A client node may interact with the blockchain system 504, for example, to send requests/responses to the blockchain system 504 and/or to receive requests/responses from the blockchain system 504. The blockchain system 504 may have more than three blockchain nodes. An (e.g., each) organization may discover data from one or more other organizations and/or make its own (e.g., local) data discoverable and/or accessible by other organizations.

As illustrated in FIG. 5A, at 510, off-chain initialization may be used, for example, to provide an (e.g., each) organization with the address or other access information for the blockchain system 504. For example, the address of Blockchain Node-1 may be configured to Client Node-1, the address of Blockchain Node-2 may be configured to Client Node-2, and/or the address of Blockchain Node-3 may be configured to Client Node-3. Off-chain initialization may be optional, for example, if Blockchain Node-1 is deployed as a part of Organization-1 502 and co-located with Client Node-1, if Blockchain Node-2 is deployed as a part of Organization-2 506 and co-located with Client Node-2, and/or if Blockchain Node-3 is deployed as a part of Organization-3 508 and co-located with Client Node-3.

At 512, an (e.g., each) organization may register with the blockchain system 504. For example, a (e.g., each) registration may be created as a transaction, which may be validated by one or more (e.g., all) blockchain nodes. A transaction (e.g., a validated transaction) may be added to the distributed ledger. In some examples, an (e.g., each) organization may be given a (e.g., an initial) credit (e.g., to be used for requesting federated data discovery and sharing provided by federated data discovery and sharing service 406 in FIG. 4), for example, as a result of successful organization registration. An (e.g., each) organization may (e.g., also) indicate to the Blockchain system 504 (e.g., during registration and/or after registration in an organization profile) a willingness for data discovery (e.g., for a portion or all of the organization's data). The Client Node of an (e.g., each) organization may contact a corresponding blockchain node, for example, to perform the registration.

For example, Client Node-1 may send a data registration request to Blockchain Node-1, which may indicate the data discovery willingness (DDW) of Organization-1. An indication of DDW may include, for example, one or more of the following types of information: the types of discoverable local data maintained by Organization-1 502; the list of organizations that may and/or may not be allowed to discover data from Organization-1 502; the gained credit that Organization-1 502 expects to collect by serving a (e.g., one) data discovery request; and/or the gained credit that Organization-1 502 may expect to collect (e.g., from other organizations) for a (e.g., each) data operation (e.g., at 532 in FIG. 5B).

Blockchain Node-1 may propagate the data registration request within the blockchain system, which may be validated by other blockchain nodes (e.g., based on a consensus protocol). In some examples, the Blockchain System 504 may (e.g., as a result) assign a (e.g., an initial) credit and/or a (e.g., an initial) reputation to Organization-1 502. A credit may be a metric, which may be used to measure whether an organization has privileges to ask other organizations to conduct data discovery. A reputation may be a metric, which may measure whether an organization can serve (e.g., service) discovery requests from other organizations and/or can provide a desired quality of discovery result.

A blockchain node may send a data registration response to a client node, for example, after the data registration request is added to distributed ledgers. For example, Blockchain Node-1 may send a data registration response to Client Node-1, which may include one or more of the following: a (e.g., an initial) credit that may be assigned to Organization-1 502 (e.g., the current remaining credit of Organization-1 502 may be equal to an initial credit); and/or a (e.g., an initial) reputation that may be assigned to Organization-1 502 (e.g., the current reputation of Organization-1 502 may be set to an initial reputation).

At 514, Client Node-1 may send a data discovery request (e.g., DDReq #1) to Blockchain Node-1. A data discovery request (e.g., DDReq #1) may include, for example, one or more of the following types of information: a reputation threshold of target organizations, such as an indication that (e.g., only) organizations with reputations higher than (e.g., or equal to) the reputation threshold may be selected (e.g., at 518) as target organizations to serve the data discovery request (e.g., DDReq #1); the data types and/or other conditions of target data to be discovered; and/or the credit that Organization-1 502 offers to pay to target organizations.

At 516, the data discovery request (e.g., DDReq #1) may be propagated within the blockchain system as a transaction. DDReq #1 may be validated by one or more (e.g., all) blockchain nodes (e.g., based on running a consensus protocol). DDReq #1 may be added to distributed ledgers maintained by each blockchain node, for example, based on validation.

At 518, a blockchain node may pre-select a list of target organizations (e.g., as a result of running a consensus protocol at 516). Target organizations may be selected, for example, based on one or more of the following factors: the information included in DDReq #1 (e.g., the reputation threshold, the data types, and/or the offered credit), DDW of other organizations, the reputation of other organizations, etc. The list of selected target organizations may be added to distributed ledgers and/or made available (e.g., known) to one or more (e.g., all) blockchain nodes. The selected target organizations may include, for example, Organization-2 506 and Organization-3 508. Discovery requests (e.g., DDReq #2 and DDReq #3) may be sent to Organization-2 506 and Organization-3 508, respectively, for example, to serve the discovery processing of DDReq #1. DDReq #2 and DDReq #3 may be generated and sent (e.g., based on DDReq #1), for example, by federated data discovery and sharing service 406 in FIG. 4, in order to realize (e.g., implement) a federated data discovery among Organization-2 506 and Organization-3 508. A final result of DDReq #1 may be based on an aggregated discovery result from DDReq #2 and DDReq #3.

At 520, Blockchain Node-2 (e.g., and/or one or more other blockchain nodes) may send a data discovery request DDReq #2 to Client Node-2. DDReq #2 may include some or all (e.g., the same or a subset) of the information that may be included in DDReq #1. For example, DDReq #1 may include three data types to be discovered. Organization-2 506 may provide one discoverable data type. DDReq #2 may include (e.g., only) the data type(s) that Organization-2 506 may provide.

At 522, Client Node-2 may receive DDReq #2. Client Node-2 may search local data of Organization-2 506, for example, according to the information that may be included in (e.g., provided by) DDReq #2. Client Node-2 may (e.g., as a result) generate a data discovery response (e.g., DDRes #2), which may include (e.g., any) discovered data (e.g., data discovery result). DDRes #2 may be responsive to or may satisfy (e.g., at least in part) DDReq #2. Client Node-2 may send DDRes #2 to Blockchain Node-2.

At 524, Blockchain Node-3 (e.g., and/or one or more other blockchain nodes) may send a data discovery request DDReq #3 to Client Node-3. DDReq #3 may include some or all (e.g., the same or a subset of) information that may be included in DDReq #1. For example, DDReq #1 may include three data types to be discovered. Organization-3 508 may provide two discoverable data types. DDReq #3 may include (e.g., only) the (e.g., two) data types that Organization-3 508 may provide.

At 526, Client Node-3 may receive DDReq #3. Client Node-3 may search local data of Organization-3 508, for example, according to the information that may be included in DDReq #3. Client Node-3 may (e.g., as a result) generate a data discovery response (e.g., DDRes #3), which may include (e.g., any) discovered data (e.g., data discovery result). DDRes #3 may be responsive to or may satisfy (e.g., at least in part) DDReq #3. Client Node-3 may send DDRes #3 to Blockchain Node-3.

As illustrated in FIG. 5B, at 528, one or more (e.g., all) blockchain nodes may wait to receive DDRes #2 and DDRes #3. The blockchain node(s) may validate (e.g., all) received responses (e.g., DDRes #2 and DDRes #3) for the (e.g., same) data discovery request (e.g., DDReq #1) from Client Node-1. The blockchain node(s) may run a consensus protocol. The blockchain node "winning" the consensus protocol may aggregate multiple (e.g., all) validated responses (e.g., DDRes #2 and DDRes #3). The blockchain node "winning" the consensus protocol may generate an (e.g., a new) aggregated response (e.g., DDRes #1) for DDReq #1, which may be added to distributed ledgers. The remaining credit of Organization-1 502 may be reduced, for example, while the remaining credit of Organization-2 506 and Organization-3 508 may be increased.

At 530, Blockchain Node-1 may be aware of DDRes #1 from distributed ledgers. Blockchain Node-1 may send DDRes #1 to Client Node-1. DDRes #1 may include the access information (e.g., address) of (e.g., all) discovered data.

At 532, Client Node-1 may perform off-chain data operations on discovered local data at Organization-2 506 and Organization-3 508, for example, according to the information that may be included in DDRes #1. Client Node-1 may, for example, send a computation task to Organization-2 506 (e.g., and/or to Organization-3 508) to be executed on the discovered data at Organization-2 506 (e.g., and/or at Organization-3 508). Client Node-1 may (e.g., alternatively), for example, retrieve the discovered data from Organization-2 506 and/or Organization-3 508.

At 534, Client Node-1 may calculate the quality of discovered data, for example, according to the data operation result at 532. Client Node-1 may send a message to Blockchain Node-1, for example, to report the calculated quality.

At 536, (e.g., all) blockchain nodes may receive the message at sent at 534. Blockchain nodes may run a consensus protocol. The reputation of Organization-1 502, Organization-2 506, and/or Organization-3 508 may be adjusted, for example, based on the consensus protocol. The remaining credit of Organization-1 502, Organization-2 506, and/or Organization-3 508 may be adjusted, for example, based on the consensus protocol. For example, Organization-1 502 may unfaithfully (e.g., falsely, incorrectly, accidentally, intentionally) report a bad quality of discovered data. Unfaithfulness may be known by blockchain nodes, for example, based on data discovery history maintained in distributed ledgers. For example, distributed ledgers may indicate another organization (e.g., Organization-4) with a high reputation previously discovered the same data from Organization-2 506 and/or Organization-3 508 and reported a good quality of the discovered data. The reputation and/or remaining credit of Organization-1 502 may be reduced, for example, based on an unfaithful report.

A collaborative federated data discovery process may use a smart contract. In an example, data may be stored in different locations and/or may belong to different organizations. An application or a user (e.g., user X) may pose a discovery request for discovering desired data, which may be owned and/or located in different organizations.

Federated discovery processing may be used to process or serve a discovery request from a user, e.g., user X. For example, the data discovery may be conducted in multiple organizations. Third-party entities (e.g., acting as discoverers) may contribute to serving a discovery request. An (e.g., each) entity may have the capability for accessing and/or conducting discovery in one or more organizations. For example, a single discoverer may not have a (e.g., full) capability for identifying the requested data among (e.g., all) the potential organizations. For example, a discoverer X may belong to an organization-A. Discoverer X may have a discovery privilege in organization-A. A discoverer Y may not belong to organization-A. Discoverer Y may be a domain administrator. Organization-A may (e.g., also) grant a discovery privilege to the discoverer Y. Different discoverers may not know and/or may not trust each other.

A smart contract may be leveraged, for example, to support building trust between different untrusted discoverers, e.g., to support collaborative work. A smart contract may have one or more of the following usages. For example, a user X may pay a service fee for a discovery request. A service fee may be deposited in the smart contract. Discoverers may have an incentive (e.g., based on a service fee) to contribute to discovery processing. A smart contract may support trust by discoverers that they will receive a service fee, for example, without worry that the user X may refuse to pay the service fee after the user X obtains the discovery result (e.g., yielded by efforts of discoverers). For example, the smart contract may indicate (e.g., specify) how the service fee will be allocated among multiple discoverers. For example, the discoverer producing high-quality discovery results or providing (e.g., paying for) more discovery processing effort may receive a higher portion of service fee (e.g., as a reward).

Figure 6:
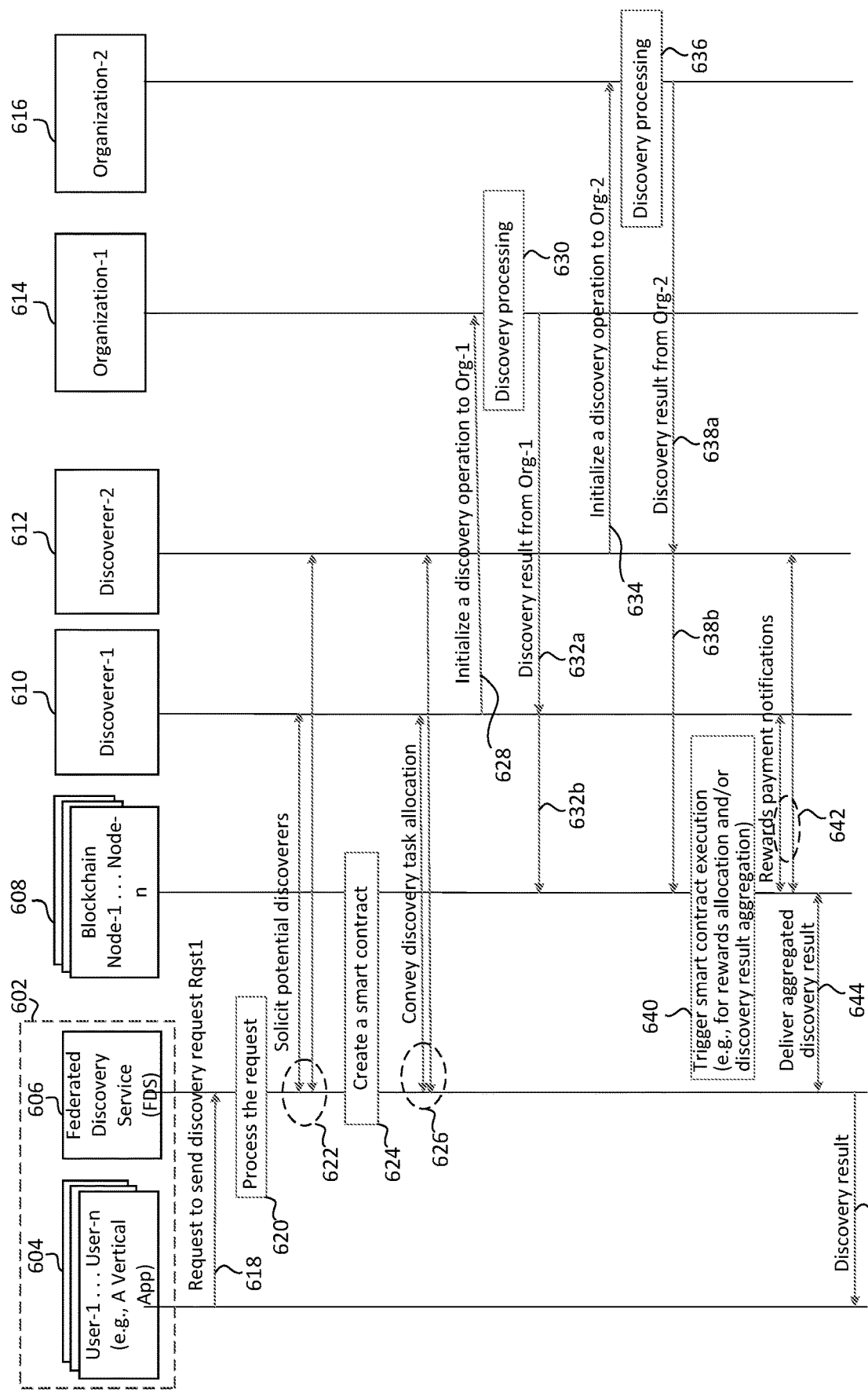
FIG. 6 illustrates an exemplary interaction diagram for a collaborative federated data discovery process using a smart contract.

FIG. 6 illustrates an example of an interaction diagram for a collaborative federated data discovery process using a smart contract. In an example (e.g., as shown in FIG. 6), participants may include one or more users (e.g., user-1 to user-n 604) variously referred to as user1-n 604 or user(s) 604, a federated discovery service (FDS) 606, one or more blockchain nodes (e.g., blockchain node-1 to node-n 608) variously referred to as blockchain node1-n 608 or blockchain node(s) 608, one or more discoverers (e.g., discoverer-1 610 and/or discoverer-2 612), and one or more organizations (e.g., organization-1 614 and/or organization-2 616). As indicated by dashed box 602 around user(s) 604 and FDS 606, in some examples, one or more of the user(s) 604 and FDS 606 may reside on or be part of a device or computing system. In some examples, user1-n 604 may include multiple connected users that may be connected with a device running the FDS service via a local connection protocol, such as Bluetooth, NFC, WiFi and the like. In an example, the FDS may reside on or be a part of a computing system that is different than the User-1 604's computing system. Blockchain nodes may be PDL nodes. For example, Blockchain Node-1 may be PDL Node-1, and so on.

In an example, the FDS may be referred to as a Data Discovery Service (DDS). The FDS 606 may enable one or more user applications (e.g., one or more of user-1 to user-n 604) to discover data from multiple organizations. A user application may issue a data discovery request to DDS 606 for discovering desired data that may be located in different organizations (e.g., organization-1 614 and/or organization-2 616). Each organization may have a data discoverer that has the capability for accessing and/or conducting discovery within its organization. The DDS 606 may serve the data discovery request from the user application. To do so, the DDS 606 may use smart contacts and/or PDL to solicit and/or coordinate multiple data discoverers (Discoverer-1 610 and Discoverer-2 612) from different organizations to work together for this data discovery request. in an example, each of the data discoverers may perform a data discovery within an organization (e.g., its organization). Data discovery resulting from those data discoverers may be aggregated and returned back to the user application.

As shown by example in FIG. 6, a federated discovery service (FDS) 606 may be available in the system for supporting federated discovery requests. The FDS 606 may interact with a blockchain system (e.g., a PDL system), for example, to create a smart contract. There may be multiple third-party entities (e.g., Discoverer-1 610 and Discoverer-2 612) that may act as discoverers, e.g., participants in federated discovery processing. In some examples (e.g., with reference to the example in FIG. 6), Discoverer-1 610 may have a discovery and access privilege for conducting discovery (e.g., only) within Organization-1 614 while Discover-2 612 may have a discovery (e.g., and access) privilege for conducting discovery (e.g., only) within Organization-2 616.

In an example (e.g., presented in FIG. 6), User-1 604 may need or desire information (e.g., an application need). User-1 604 may seek to identify data that may be of interest to User-1. User-1 604 may leverage the FDS 606, for example, to discover the desired data, which may reside in different organizations and/or may be stored in different locations/nodes.

As illustrated in FIG. 6, at 618, User-1 604 may send a data discovery request to the FDS 606. The data discovery request may include, for example, one or more of the following: a user ID (e.g., to indicate the identification of the user); desired data types (e.g., to indicate requested data types or what types of data to discover); a suggested data source; suggested discoverer(s); a performance or quality of service (QOS) requirement; a service fee; and/or an indication whether to store discovery results in the blockchain.

A suggested data source (e.g., residence) parameter may indicate (e.g., for a given desired data type) one or more potential places for conducting the discovery. A source/residence may be general and/or specific. For example, User-1 604 may be interested in blood testing and radiology exam-related data. A suggested data source/residence may suggest conducting data discovery in one or more healthcare organizations/nodes. The FDS 604 may determine where to conduct federated discovery (e.g., based on an FDS 604 knowledge base), for example, if a suggested data source parameter is not provided for a request.

A suggested discoverer(s) parameter may indicate whether User-1 604 has one or more preferred discoverers. The FDS 606 may (e.g., first) consult the preferred discoverer(s), if any, to determine whether the preferred discoverer(s) are willing to process the federated discovery request from User-1 604. The FDS 606 may select one or more appropriate discoverers (e.g., based on an FDS 606 knowledgebase), for example, if a suggested discoverer(s) parameter is not specified and/or indicated in the discovery request.

A performance or QoS-related requirement parameter may indicate a performance or QoS to be reflected in a smart contract. A performance or QoS parameter may indicate, for example, one or more of the following: a maximum tolerated processing time for conducting a federated discovery request; the quality of a discovery result; a maximum number of returned discovery items; and/or the like.

A service fee parameter may indicate a service fee that User-1 604 is willing to pay. A service fee may be deposited into and/or made a part of the corresponding smart contract.

An indication whether to store discovery results in the blockchain may indicate whether to store a final discovery result in the blockchain system (e.g., a PDL system), for example, for future traceability purposes.

At 620, the FDS 606 may process the request received from User-1 604. The FDS may (e.g., first) determine whether User-1 604 has a right to ask the FDS 606 to conduct data discovery. If so, the FDS 606 may examine the details of the request, for example, to determine what types of data User-1 604 is looking for. For example, the FDS 606 may determine that the desired data may be stored in multiple organizations (e.g., Organization-1 614 and Organization-2 616). The FDS 606 may determine that User-1 604 did not specify a preferred discoverer. The FDS 606 may (e.g., using FDS 606 knowledge) identify the discoverers that may be leveraged (e.g., used) to serve the federated discovery request from User-1 604. The FDS 606 may maintain a list of discoverers. For example, different entities may register with the FDS 606 to indicate that they are willing to act as discoverers (e.g., to participate in federated discovery processing). In an example, the FDS 606 may determine that there is not a single discoverer with discovery privileges in Organization-1 614 and Organization-2 616. Discoverer-1 610 and Discoverer-2 612 may have discovery and access privileges to conduct discovery within Organization-1 614 and Organization-2 616, respectively. The FDS 606 may make a data discovery proposal for each of the potential discoverers, for example, so that they can work collaboratively to serve (e.g., service) the discovery request.

At 622, the FDS 606 may send out solicitation requests (e.g., discovery proposals) to Discoverer-1 610 and Discoverer-2 612. The solicitations may request whether Discoverer-1 610 and Discoverer-2 612 are willing to help process the discovery request from User-1 604. A discovery proposal (e.g., solicitation request) may include, for example, one or more of the following: a request originator ID (e.g., to indicate who initiated a discovery request, such as User-1 604 in this example); and/or a data discovery proposal for a discoverer. A data discovery proposal for a discoverer may include, for example, one or more of the following: where to conduct the discovery (e.g., for Discoverer-1 610, the FDS may indicate to conduct discovery in Organization-1 614); desired data type(s) (e.g., to indicate what types of data the discoverer may be expected to discover); performance or QoS-related needs (e.g., the maximum tolerated processing time for conducting a federated discovery request, the quality of a discovery result, the maximum number of returned discovery items, and/or the like); and/or potential rewards (e.g., to indicate the potential rewards that may be expected). Discoverer-1 610 and/or Discoverer-2 612 may accept the tasks in the discovery proposals, for example, if Discoverer-1 610 and/or Discoverer-2 612 agree to the received proposals. Discoverer-1 610 and/or Discoverer-2 612 may (e.g., otherwise) return (e.g., send back) feedback (e.g., to further negotiate with the FDS).

At 624, the FDS 606 may receive an acknowledgment and/or feedback from the selected discoverers. The FDS 606 may make (e.g., further) updates/revisions to the proposals (e.g., based on feedback seeking updates/revisions), for example, if an update/revision is warranted and accepted (e.g., to promote acceptance of updated proposals by the discoverers). The FDS 606 may send a transaction to a Blockchain Node-1 608 (e.g., PDL Node-1), for example, to create a smart contract based on the final discovery proposals. A smart contract may indicate (e.g., specify), for example, one or more of the following: a federated discovery request originator ID; a service fee paid by the originator; and/or other information.

A federated discovery request originator ID may indicate, for example, an identity of the user initiating the discovery request (e.g., User-1 604 in this example).

The service fee paid by the originator may indicate the service fee paid by the request originator (e.g., User-1 604 in this example). The service fee may be deposited in the smart contract.

Other information may include (e.g., for each desired data type to be discovered), for example, one or more of the following: the corresponding discoverer(s) (e.g., the discoverers allowed to trigger the smart contract); where to conduct the discovery (e.g., from which organization or from which nodes to seek requested information); performance or QoS-related needs (e.g., the maximum tolerated processing time for conducting a federated discovery request; the policy of how to evaluate the quality of the discovery result; the maximum number of returned discovery items; and/or the like); rewards allocation policy (e.g., details indicating how the rewards should be allocated).

At 626, the FDS 606 may send a notification to one or more of the involved discoverers (e.g., Discoverer-1 610 and Discoverer-2 612 in this example). In an example, the notification may include one or more of the following: the final data discovery proposal; the access address on the blockchain nodes (e.g., for triggering the smart contract); and/or the smart contract ID.

The final data discovery proposal for a discoverer may indicate, for example, what to discover, where to discover, and/or potential rewards.

The access address on the blockchain nodes (e.g., for triggering the smart contract) may indicate, for example, how the discoverer may interact with the Blockchain system (e.g., to trigger a smart contract). For example, Discoverer-1 610 and Discoverer-2 612 may interact with Blockchain Node-1 608.

The smart contract ID may indicate, for example, the ID of the smart contract corresponding to the federated discovery request from User-1 604.

At 628, Discoverer-1 610 may initiate a discovery request. Discoverer-1 610 may send the discovery request to Organization-1 614. The discovery request may indicate, for example, the types of data that may be discovered and/or performance or QoS-related requirements (e.g., the maximum tolerated discovery processing, and/or the like).

At 630, Organization-1 614 may (e.g., first) determine whether Discoverer-1 610 has the right privilege to conduct data discovery within Organization-1 614. If so, Organization-1 614 may accept the request. Organization-1 614 may (e.g., start to) conduct discovery processing, for example, by considering the performance and QoS requirements (e.g., if any).

At 632a, Organization-1 614 may return the discovery result to Discoverer-1 610. Discoverer-1 610 may (e.g., further) transform and/or reformat the discovery result, for example, depending on the format requirement of the smart contract. At 632b, Discoverer-1 610 may send (e.g., forward) the discovery result to the smart contract (e.g., at Blockchain Node-1 608), for example, as a smart contract trigger.

Discoverer-2 612, Organization-2 616 and Blockchain Node-1 608 may (e.g., concurrently) perform processing similar to the processing performed by Discoverer-1 610, Organization-1 614 and Blockchain Node-1 608.

At 634, Discoverer-2 612 may initiate a discovery request. Discoverer-2 612 may send the discovery request to Organization-2 616. The discovery request may indicate, for example, what types of data may be discovered and/or performance or QoS-related requirements (e.g., the maximum tolerated discovery processing, and/or the like).

At 636, Organization-2 616 may (e.g., first) determine whether Discoverer-2 612 has the right privilege to conduct data discovery within Organization-2 616. If so, Organization-2 616 may accept the request. Organization-2 616 may (e.g., start to) conduct discovery processing, for example, by considering the performance and QoS requirements (e.g., if any).

At 638a, Organization-2 616 may return the discovery result to Discoverer-2 612. Discoverer-2 612 may (e.g., further) transform and/or reformat the discovery result, for example, depending on the format requirement of the smart contract. At 638b, Discoverer-2 612 may send (e.g., forward) the discovery result to the smart contract (e.g., at Blockchain Node-1 608), for example, as a smart contract trigger.

At 640, the smart contract may evaluate the quality of the discovery result, for example, after the smart contract receives the discovery results from (e.g., all off) the involved discoverers (e.g., Discoverer-1 610 and Discoverer-2 612 in this example). The smart contract may (e.g., based on the evaluation) decide (e.g., automatically decide) how to allocate the rewards among the different discoverers (e.g., Discoverer-1 610 and Discoverer-2 612 in this example). The smart contract may aggregate (e.g., all of) the received discovery results, for example, to produce a combined, aggregated or final discovery result of the federated discovery request from User-1 604.

At 642, the smart contract may complete the rewards allocations. The smart contract may (e.g., also) send notifications to the involved discoverers regarding the rewards payments.

At 644, the smart contract may (e.g., also) deliver the final or aggregated discovery result to the FDS 606.

At 646, the FDS 606 may return the aggregated discovery result to User-1 604.

Each of the organization entities described herein (e.g., in FIG. 5 and FIG. 6) may be a part of a network node that represents the organization (e.g., a data storage node, a gateway node, a data repository node of an organization, etc.)

The FDS 606 may be implemented in or located at, for example, a (e.g., an individual) physical network node (e.g., a proxy node between a user, such as User-1 604, and a blockchain node, such as Blockchain Node1 608). The FDS 606 may be implemented within a blockchain system, e.g., in a physical blockchain node such as blockchain node(s) 608. The FDS 606 may be implemented on a device on the user's side. For example, as indicated by dashed box 602 in FIG. 6, an FDS 606 may be implemented on a WTRU, a mobile terminal, a base station, a road-side unit, etc.

Systems, methods, and instrumentalities are described herein for blockchain-based federated data discovery and sharing. A device running a federated data discovery and sharing service may solicit one or more discoverers to serve a federated data discovery request indicating a set of data types to be discovered. A discovery solicitation request may include a discovery proposal for a discoverer. The discovery proposal may include at least the data type(s) to be discovered by the solicited discoverer(s), the organization(s) that may provide the data type(s), the performance parameter(s), or the service fee(s).

A discovery proposal may be updated, for example, based on a negotiation with a discoverer. An (e.g., acknowledged/agreed) transaction may be provided to a blockchain node. A smart contract may be generated for the federated data discovery request. Notification(s) about triggering the smart contract may be provided (e.g., as a discovery task allocation) to the one or more discoverers. A (e.g., an aggregated) discovery result responsive to the federated data discovery request may be received based on performance of the discovery task(s) with the organization(s) by the discoverer(s).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

The invention claimed is:

1. A federated data service (FDS) device comprising:
a processor configured to:
obtain a federated data discovery request, wherein the federated data discovery request comprises at least an indication of a set of desired data types to be discovered, an indication of a service fee to be deposited into a smart contract, and an indication of whether to store discovery results in a distributed ledger system, and wherein the service fee is to be paid to a plurality of discoverers associated with respective organizations;

identify a first discoverer of the plurality of discoverers and a second discoverer of the plurality of discoverers to be solicited to collaboratively serve the federated data discovery request, wherein the first discoverer is associated with a first organization and the second discoverer is associated with a second organization;

send, using the smart contract, a first solicitation request to the first discoverer and a second solicitation request to the second discoverer, wherein the first solicitation request and the second solicitation request are sent to collaboratively serve the federated data discovery request;

receive, from the first discoverer, a first discovery result;

receive, from the second discoverer, a second discovery result; and generate an aggregated discovery result based on the first discovery result received from the first discoverer and the second discovery result received from the second discoverer.

2. The FDS device of claim 1, wherein the processor is further configured to:

send a transaction to a distributed ledger node for creating the smart contract, wherein the smart contract enables each of the first discoverer and the second discoverer to serve the federated data discovery request; and send a first notification to the first discoverer and a second notification to the second discoverer, wherein the first notification or the second notification indicates information about triggering the smart contract associated with the federated data discovery request.

3. The FDS device of claim 1, wherein the processor is configured to receive the federated data discovery request from a user, and wherein the federated data discovery request further comprises at least one of a user identifier associated with the user, a set of suggested discoverers, or a set of performance related parameters.

4. The FDS device of claim 1, wherein the first solicitation request further comprises a request originator identifier, an indication of the first organization associated with the first discoverer, a set of performance related parameters, or an indication of potential awards.

5. The FDS device of claim 2, wherein the first notification or the second notification further comprises at least one of: a final data discovery proposal associated with the federated data discovery request, an access address associated with a node of the distributed ledger system, or an identifier associated with the smart contract.

6. The FDS device of claim 1, wherein the processor is further configured to determine that the first organization is associated with at least a first data type of the set of desired data types and the second organization is associated with at least a second data type of the set of desired data types.

7. The FDS device of claim 2, wherein the processor is further configured to:

determine that an update for the first solicitation request associated with the first discoverer is needed;

generate an updated first solicitation request based on the determination that the update for the first solicitation request associated with the first discoverer is needed;

send the updated first solicitation request to the first discoverer; and receive, from the first discoverer, a message indicating that the first discoverer is willing to negotiate a discovery proposal associated with the first solicitation request.

8. The FDS device of claim 3, wherein the processor is further configured to send the aggregated discovery result to the user.

9. The FDS device of claim 2, wherein the transaction comprises at least a federated discovery request originator identifier and the indication of the service fee to be paid by an originator.

10. A method implemented by a federated data service (FDS) device, the method comprising:

obtaining a federated data discovery request, wherein the federated data discovery request comprises at least an indication of a set of desired data types to be discovered, an indication of a service fee to be deposited into a smart contract, and an indication of whether to store discovery results in a distributed ledger system, and wherein the service fee is to be paid to a plurality of discoverers associated with respective organizations;

identifying a first discoverer of the plurality of discoverers and a second discoverer of the plurality of discoverers to be solicited to collaboratively serve the federated data discovery request, wherein the first discoverer is associated with a first organization and the second discoverer is associated with a second organization;

sending, using the smart contract, a first solicitation request to the first discoverer and a second solicitation request to the second discoverer, wherein the first solicitation request and the second solicitation request are sent to collaboratively serve the federated data discovery request;

receiving, from the first discoverer, a first discovery result;

receiving, from the second discoverer, a second discovery result; and generating an aggregated discovery result based on the first discovery result received from the first discoverer and the second discovery result received from the second discoverer.

11. The method of claim 10, further comprising:

sending a transaction to a distributed ledger node for creating the smart contract, wherein the smart contract enables each of the first discoverer and the second discoverer to serve the federated data discovery request; and sending a first notification to the first discoverer and a second notification to the second discoverer, wherein the first notification or the second notification indicates information about triggering the smart contract associated with the federated data discovery request.

12. The method of claim 10, wherein the federated data discovery request is received from a user, and wherein the federated data discovery request further comprises at least one of a user identifier associated with the user, a set of suggested discoverers, or a set of performance related parameters.

13. The method of claim 10, wherein the first solicitation request further comprises a request originator identifier, an indication of the first organization associated with the first discoverer, a set of performance related parameters, or an indication of potential awards.

14. The method of claim 11, wherein the first notification or the second notification further comprises at least one of: a final data discovery proposal associated with the federated data discovery request, an access address associated with a node of the distributed ledger system, or an identifier associated with the smart contract.

15. The method of claim 10, further comprising:
determining that the first organization is associated with at least a first data type of the set of desired data types and the second organization is associated with at least a second data type of the set of desired data types.

16. The method of claim 11, further comprising:
determining an update for the first solicitation request associated with the first discoverer is needed;
generating an updated first solicitation request based on the determination that the update for the first solicitation request associated with the first discoverer is needed;
sending the updated first solicitation request to the first discoverer; and
receiving, from the first discoverer, a message indicating that the first discoverer is willing to negotiate a discovery proposal associated with the first solicitation request.

17. The method of claim 11, wherein the transaction comprises at least a federated discovery request originator identifier and the indication of the service fee to be paid by an originator.

18. The method of claim 12 further comprising:
sending the aggregated discovery result to the user.

* * * * *